Feb. 9, 1932.    L. T. MEDHOLDT    1,844,225
METHOD OF TRUING THE TEETH OF SAW BLADES
Original Filed Aug. 8, 1927
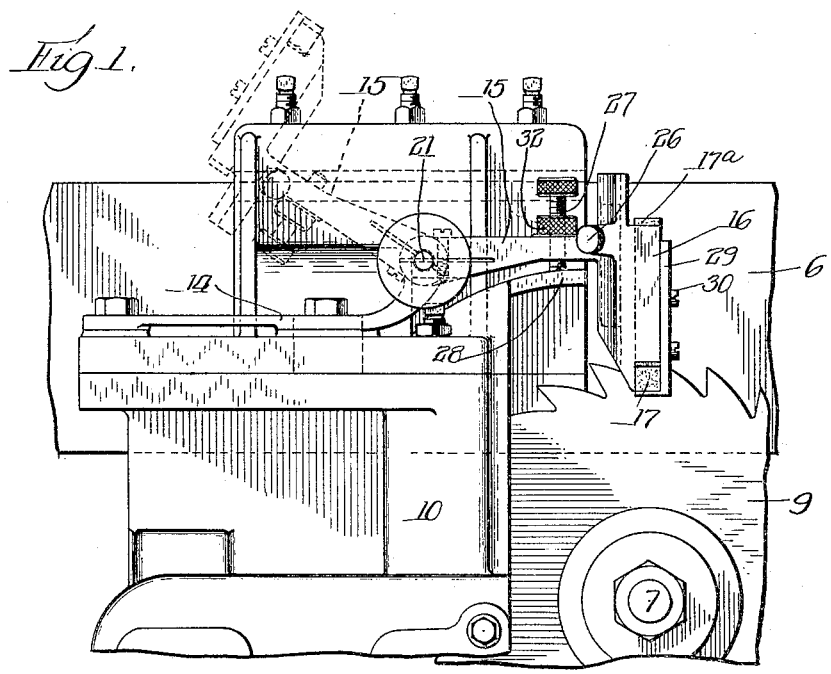
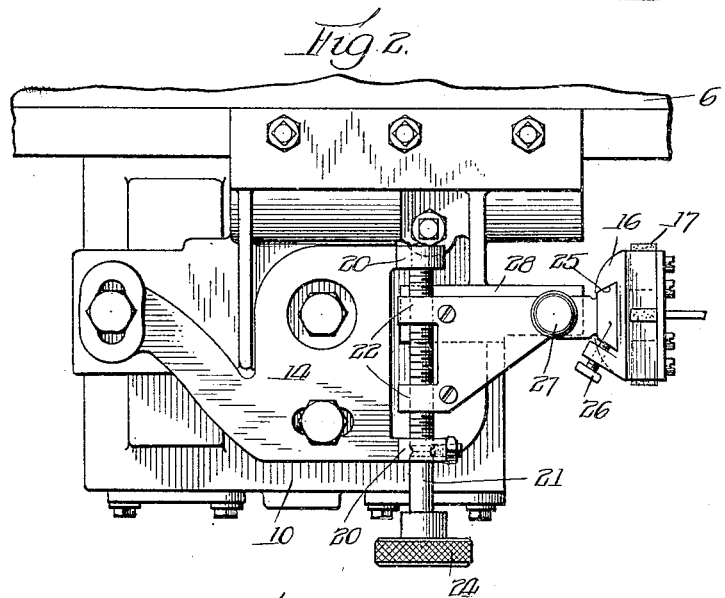
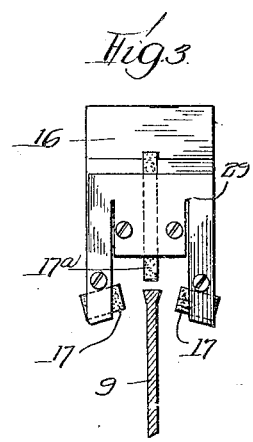
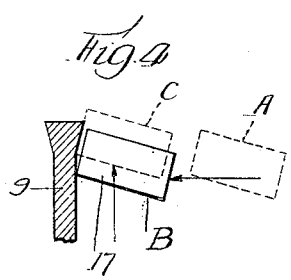
Inventor:
Louis T. Medholdt, Patented Feb. 9, 1932

1,844,225

UNITED STATES PATENT OFFICE

LOUIS T. MEDHOLDT, OF ROCKFORD, ILLINOIS, ASSIGNOR TO MATTISON MACHINE WORKS, OF ROCKFORD, ILLINOIS, A CORPORATION OF ILLINOIS

METHOD OF TRUING THE TEETH OF SAW BLADES

Original application filed August 8, 1927, Serial No. 211,303. Divided and this application filed February 3, 1930. Serial No. 425,693.

The invention relates generally to the art of sawing and more particularly to an improved method of truing the teeth of saw blades.

The invention contemplates primarily the truing of the teeth of saws of a circular blade type such as those commonly used in rippers or jointers, wherein lumber is ripped or jointed for glueing purposes. In such machines it is desirable to have the cut edges so perfect that two or more of the pieces, after passing through the machine, may be successfully glued without further finishing. To obtain so accurate a cut it is essential not only to provide the machine with a proper mounting for the saw blade and efficient means for feeding the work through the machine in a straight line, but also to obtain saw blades with teeth which will cut uniformly.

For the purpose of obtaining such uniform teeth, it has been the practice to true the teeth of the saw blade while the blade is running at normal speed so that the corresponding cutting edges of the different teeth are in peripheral alinement. This operation is known generally in the art as "jointing" the saw teeth. Generally the dressing of the teeth has been accomplished by positioning an abrasive element with a surface parallel to the side edges of the teeth of the saw then moving the element perpendicularly to the saw blade and into contact with the sides of the saw teeth. This method, however, has caused the abrasive element to be notched at the point where it contacts the tips of the saw teeth and not only has made it necessary to renew the element frequently but has caused improper jointing of the teeth.

The general object of the invention is to provide a new and improved method of truing saw blades which avoids the tendency of the saw teeth to gouge and break away the abrasive element so that the teeth of the saw blade may be peripherally alined with greater accuracy than has been heretofore obtainable.

A further object is to provide an improved method of truing saw teeth whereby an abrasive element is moved into engagement with the sides of the teeth by movement outwardly from and substantially radially with respect to the saw axis.

For the purpose of illustrating more clearly the practice of my invention, I have illustrated an apparatus adapted to utilize the new method, but it is to be understood that the form of the apparatus may be varied at will without departing from the spirit and scope of the invention as expressed in the claims.

In the drawings:

Figure 1 is a fragmental elevational view of a machine adapted to the present invention.

Fig. 2 is a fragmental plan view of the machine shown in Fig. 1.

Fig. 3 is an end elevational view of the tool arm as viewed from the right in Fig. 2, the saw blade being shown in section.

Fig. 4 is a sectional view of a saw blade of the swaged tooth type illustrating somewhat diagrammatically the various positions of the abrasive element in the practice of the present method.

In the drawings, a fragmental portion of a rip saw or jointer is shown of the type wherein the saw blade is mounted on an arbor which overhangs the work table. A portion 6 of the main frame (not shown) projects above the work table (not shown) and rotatably supports a horizontal saw arbor 7 so that it projects over the work table. Upon the arbor 7 a saw blade 9 is mounted so as to be positioned directly above the feed chain or other work advancing means (not shown). The saw blade 9 is provided with a guard in the form of a housing having similar sections 10 (only one herein shown) mounted on the portion 6 of the frame so that they may be separated longitudinally of the machine to expose the saw 9.

For the purpose of truing the saw teeth, a bracket 14 is attached to the housing 10 to support an arm 15 pivotally mounted in the bracket and carrying a member 16 at its outer end. The member 16 is adjustably mounted on the free end of the arm 15 and is arranged to support abrasive elements 17.

As shown in Fig. 2, the bracket 14 has a pair of up-standing lugs 20 spaced laterally of the housing and having bearings therein to receive a pivot for the arm 15. The pivot as herein shown comprises a shaft 21 rotatably mounted in the bearings in the lugs 20 and engaging two laterally spaced lugs 22 on the end of the arm 15. The shaft 21 and the lugs 22 are in screw threaded engagement with each other so that the arm 15 may be adjusted laterally of the saw blade by turning a knurled handle 24 fixed on the end of the shaft 21. The bracket 14 is preferably positioned so that the arm 15, when swung about its pivot 21, moves the abrasive element 17 substantially radially of the saw blade 9. The member 16 is preferably mounted for adjustment transversely of the arm 15 on ways 25 and may be secured in position by means of a thumb screw 26.

The arm 15 is adapted, during normal operation of the machine, to be swung back from the operative position shown in full lines in Fig. 1 to the inoperative position shown in dotted lines. When the arm is in its operative position adjacent to the saw 9, it is held against downward movement by an adjusting screw 27 carried by the arm 15 and engaging a lug 28 extending from the housing section 10. The screw 27 is used to obtain feeding movement of the abrasive elements substantially radially of the saw 9.

The member 16 is adapted to receive a plurality of abrasive elements, in the present case three, two of which are the elements 17 adapted to be brought into operative engagement with the opposite sides of the saw teeth and the other of which is a centrally positioned element 17$^a$ which may be brought into engagement with the peripheral or top edges of the teeth. The elements 17 and 17$^a$ are secured to the member 16 for individual adjustment by means of a plate 29 which is attached to the member 16 by screws 30.

In the practice of my improved method, the corners of the saw teeth are preferably brought into peripheral alinement by first jointing the peripheral or top edges of the teeth so that all points thereon are equi-distant from the axis of the saw and then successively dressing the sides of the teeth until all of the teeth become uniform.

The jointing of the outer peripheral surface of the teeth is accomplished by moving the abrasive element 17$^a$ substantially radially of the saw 9 into contact with the teeth. In dressing the sides of the teeth, one of the elements 17 is first adjusted to the proper angle and may then be moved from a position A (Fig. 4) laterally of the saw 9 until the corner of the element 17 contacts the side of the saw as shown in position B. The element is then moved substantially radially of the saw to position C. During the latter part of the movement of the element 17 from position B to position C, the sides of the teeth will be dressed so that the tips of the teeth will be peripherally alined.

It is, of course, to be understood that my invention contemplates the truing of the saw by the above described steps, either in the order stated or by first dressing the sides of the teeth.

To join the top or peripheral edges of the teeth, the abrasive element 17$^a$ may be fed towards and into engagement with the teeth by means of the thumb screw 27 and to lock the screw in any adjusted position, a nut 32 may be positioned on the screws.

To dress the side edges of the teeth, the arm 15 is first adjusted by means of the screw 27 so that the element 17$^a$ clears the teeth and so that when the arm is moved laterally by means of the pivot screw 21 an abrasive element 17 is moved from a position corresponding to A of Fig. 4 to that corresponding to B. In this B position, the advance tip of the abrasive element may contact the saw blade, the edge of the abrasive element adjacent the sides of the teeth being parallel to the said sides. By manipulating the thumb screw 27 to swing the arm 15 outwardly of the saw, the abrasive element is fed into a position corresponding with that designated C in Fig. 4 wherein it engages and dresses the sides of the saw teeth. This procedure may then be repeated to dress the opposite side edges of the teeth by means of the other abrasive element 17.

It is believed apparent that by feeding the abrasive element outwardly from the axis of the saw when dressing the sides of the teeth there is no tendency for the tip of the teeth to gouge into the element such as is present if the element is fed laterally into engagement with the side edges. By truing the top edges and also the side edges while the saw blade is operating at its normal speed, the teeth become properly jointed so that they will cut uniformly.

This application is a division of my application No. 211,303, filed August 8, 1927.

I claim as my invention:

1. The method of dressing saw blade teeth which consists in moving an abrasive element laterally into contact with the side of the blade inwardly of the teeth, then moving said element outwardly along the side of the saw into engagement with the inclined sides of the teeth with the contacting surfaces of the abrasive element and teeth parallel, and effecting relative rotary motion between the blade and said element.

2. The method of dressing the angularly disposed sides of the teeth of a rotating saw which consists in feeding an abrasive element parallel to the body of the rotating saw into contact with said sides of the teeth.

3. The method of dressing the angularly disposed sides of the teeth of a rotary saw which consists in positioning an abrasive element adjacent to the side of the saw with one edge of the abrasive substantially parallel to the sides of the teeth and positioned at an angle to the saw which equals the angle to which the saw teeth are to be dressed, and moving the abrasive substantially radially outwardly of said saw blade in a plane parallel to said blade into contact with the teeth while the angular relation of the saw and abrasive is maintained so as to dress the sides of the teeth to the desired angle.

In testimony whereof, I have hereunto affixed my signature.

LOUIS T. MEDHOLDT.